(12) United States Patent
Wong et al.

(10) Patent No.: US 7,587,422 B2
(45) Date of Patent: Sep. 8, 2009

(54) TRANSPARENT FILE REPLICATION USING NAMESPACE REPLICATION

(75) Inventors: Thomas K. Wong, Pleasanton, CA (US); Panagiotis Tsirigotis, Sunnyvale, CA (US); Anand Iyengar, Mountain View, CA (US); Rajeev Chawla, Union City, CA (US)

(73) Assignee: Neopath Networks, Inc., Santa Clara, CA (US)

( * ) Notice: Subject to any disclaimer, the term of this patent is extended or adjusted under 35 U.S.C. 154(b) by 330 days.

(21) Appl. No.: 10/831,701

(22) Filed: Apr. 23, 2004

(65) Prior Publication Data
US 2004/0267752 A1   Dec. 30, 2004

Related U.S. Application Data

(60) Provisional application No. 60/465,578, filed on Apr. 24, 2003, provisional application No. 60/465,579, filed on Apr. 24, 2003.

(51) Int. Cl.
*G06F 17/30* (2006.01)

(52) U.S. Cl. ............... 707/104.1; 707/204; 709/217; 709/223

(58) Field of Classification Search .......... 707/10, 707/104.1, 200, 204, E17.01, E17.032; 709/214, 709/215, 217, 223, 226, 201, 207; 711/161, 711/162
See application file for complete search history.

(56) References Cited

U.S. PATENT DOCUMENTS

| | | |
|---|---|---|
| 5,689,701 A | 11/1997 | Ault et al. |
| 5,774,715 A | 6/1998 | Madany et al. |
| 5,890,169 A | 3/1999 | Wong et al. |

(Continued)

FOREIGN PATENT DOCUMENTS

EP   0 926 585   6/1999

(Continued)

OTHER PUBLICATIONS

Notification of Transmittal of the International Search Report and the Written Opinion, PCT/US04/12841, Oct. 13, 2004, 9 pages.

(Continued)

*Primary Examiner*—Leslie Wong
(74) *Attorney, Agent, or Firm*—Weaver Austin Villeneuve & Sampson LLP

(57) ABSTRACT

A NAS switch, in the data path of a client and a NAS file server on the storage network, provides a centralized point of reconfiguration after a network change that alleviates the need for reconfiguration of each connected client. The client uses a NAS request to access a storage object to the NAS switch using a switch file handle that is independent of object location and that can be used to locate the primary and its replica storage objects if the object is subsequently replicated. A replication module replicates a namespace separately from data contained therein. Afterwards, synchronicity module looks-up the switch file handle in a file handle replication table to determine if the object has been replicated and, if so, sends one of the replica NAS file handles. The synchronicity module also maintains synchronicity between the primary and replica file servers through critical NAS requests that modify objects such as create, delete, and the like.

34 Claims, 8 Drawing Sheets

U.S. PATENT DOCUMENTS

| | | | |
|---|---|---|---|
| 5,933,825 | A | 8/1999 | McClaughry et al. |
| 6,101,508 | A | 8/2000 | Wolff |
| 6,314,460 | B1 | 11/2001 | Knight et al. |
| 6,353,837 | B1 | 3/2002 | Blumenau |
| 6,389,427 | B1 | 5/2002 | Faulkner |
| 6,408,298 | B1 | 6/2002 | Van et al. |
| 6,442,548 | B1 | 8/2002 | Balabine et al. |
| 6,453,354 | B1 | 9/2002 | Jiang et al. |
| 6,606,690 | B2 | 8/2003 | Padovano |
| 6,697,846 | B1 | 2/2004 | Soltis |
| 6,711,625 | B1 | 3/2004 | Simpson |
| 6,931,410 | B2 | 8/2005 | Anderson et al. |
| 6,938,039 | B1 | 8/2005 | Bober et al. |
| 6,985,956 | B2 * | 1/2006 | Luke et al. ................... 709/229 |
| 6,996,714 | B1 | 2/2006 | Halasz et al. |
| 7,054,927 | B2 | 5/2006 | Ulrich et al. |
| 7,072,917 | B2 | 7/2006 | Wong et al. |
| 7,089,293 | B2 * | 8/2006 | Grosner et al. .............. 709/217 |
| 7,096,253 | B2 | 8/2006 | Vinson et al. |
| 7,120,666 | B2 | 10/2006 | McCanne et al. |
| 7,308,709 | B1 | 12/2007 | Brezak et al. |
| 7,441,011 | B2 | 10/2008 | Lin et al. |
| 2002/0013832 | A1 * | 1/2002 | Hubbard ..................... 709/220 |
| 2002/0111929 | A1 | 8/2002 | Pudipeddi et al. |
| 2002/0120763 | A1 * | 8/2002 | Miloushev et al. .......... 709/230 |
| 2002/0133491 | A1 | 9/2002 | Sim et al. |
| 2002/0161855 | A1 | 10/2002 | Manczak et al. |
| 2003/0037061 | A1 | 2/2003 | Sastri et al. |
| 2003/0056112 | A1 | 3/2003 | Vinson et al. |
| 2003/0154236 | A1 | 8/2003 | Dar et al. |
| 2003/0177178 | A1 | 9/2003 | Jones et al. |
| 2003/0182313 | A1 | 9/2003 | Federwisch et al. |
| 2003/0195903 | A1 | 10/2003 | Manley et al. |
| 2003/0204670 | A1 | 10/2003 | Holt et al. |
| 2004/0010714 | A1 | 1/2004 | Stewart |
| 2004/0024963 | A1 | 2/2004 | Talagala et al. |
| 2004/0054748 | A1 | 3/2004 | Ackaouy et al. |
| 2004/0078465 | A1 * | 4/2004 | Coates et al. ................ 709/226 |
| 2004/0088297 | A1 | 5/2004 | Coates et al. |
| 2004/0117438 | A1 * | 6/2004 | Considine et al. ........... 709/203 |
| 2004/0139167 | A1 | 7/2004 | Edsall et al. |
| 2004/0267831 | A1 | 12/2004 | Wong et al. |
| 2005/0033932 | A1 | 2/2005 | Pudipeddi et al. |
| 2005/0055402 | A1 | 3/2005 | Sato |
| 2005/0125503 | A1 | 6/2005 | Iyengar |
| 2005/0188211 | A1 | 8/2005 | Scott et al. |
| 2006/0080371 | A1 | 4/2006 | Wong et al. |
| 2006/0161746 | A1 | 7/2006 | Wong et al. |
| 2006/0271598 | A1 | 11/2006 | Wong et al. |
| 2007/0024919 | A1 | 2/2007 | Wong et al. |
| 2007/0136308 | A1 | 6/2007 | Tsirigotis et al. |
| 2008/0114854 | A1 | 5/2008 | Wong et al. |

FOREIGN PATENT DOCUMENTS

| | | |
|---|---|---|
| EP | 1 209 556 | 5/2002 |
| WO | 2004/097571 | 4/2004 |
| WO | 2004/097686 | 4/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | 2006/080371 | 8/2006 |
| WO | 2007/041456 | 10/2006 |
| WO | 2007/002855 | 1/2007 |
| WO | 2007/041456 | 4/2007 |

OTHER PUBLICATIONS

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of Transmittal of the International Search Report and the Written Opinion, PCT/US04/30180, Mar. 27, 2006, 8 pages.

Anderson, D.C. et al., "Interposed Request Routing For Scalable Network Storage,".ACM Transactions on Computer Systems, Feb. 2002, vol. 20, No. 1, pp. 1-24.

Bright, J.D. et al., "A Scalable Architecture For Clustered Network Attached Storage," Twentieth IEEE/Eleventh NASA Goodard Conference On Mass Storage Systems & Technologies, Apr. 7-10, 2003, 12 pages, Paradise Point Resort, San Diego, CA, USA.

Goldick, J., "Retry Of Extending Networking Design Notes," PSC, Carnegie-Mellon University, Feb. 1995, 42 pages.

"Leveraging The Benefits Of The EMC CLARiiON IP4700 Network File Server With The Oracle8i Database," an Engineering White Paper, Mar. 5, 2002, EMC Corporation.

"Notification Of Transmittal Of The International Search Report And The Written Opinion Of The International Searching Authority, Or The Declaration," for PCT/US04/12844, Mar. 14, 2005, 14 pages.

A Scalable Architecture for Clustered Network Attached Storage, IEEE/NASA MSST2003, Apr. 7-10, San Diego, California, U.S.A.

Leveraging the Benefits of the EMC CLARiiON IP4700 NFS with the Oracle8i Database, an Engineering White Paper, Mar. 5, 2002, EMC Corporation.

Anderson et al., Interposed Request for Scalable Network Storage, ACM Transactions on Computer Systems, vol. 20, No. 1, Feb. 2002.

Jonathan Goldick, Retry of extending networking design notes, PSC, Carnegie-Mellon University, Feb. 1995.

PCT International Search Report and Written Opinion, PCT/US06/25430, May 8, 2007, 8 pages.

Office Action, U.S. Appl. No. 10/832,785, mailed Jan. 3, 2007.

Office Action, U.S. Appl. No. 10/832,785, mailed Aug. 31, 2007.

Office Action, U.S. Appl. No. 11/324,845, mailed Jan. 11, 2008.

Office Action, U.S. Appl. No. 10/831,376, mailed Mar. 23, 2007.

Final Office Action, U.S. Appl. No. 10/831,376, mailed Aug. 10, 2007.

Office Action, U.S. Appl. No. 11/241,554, mailed Aug. 8, 2007.

Notice of Allowance mailed Oct. 22, 2007, for U.S. Appl. No. 10/831,376.

Allowed Claims, U.S. Appl. No. 10/831,376, dated Oct. 22, 2007.

Office Action mailed May 28, 2008, for U.S. Appl. No. 10/832,785.

Final Office Action mailed Sep. 5, 2008, for U.S. Appl. No. 11/324,845.

Final Office Action, U.S. Appl. No. 11/241,554, mailed Jul. 25, 2008.

International Search Report sent Sep. 30, 2008 for PCT Application No. PCT/US05/35624.

Written Opinion sent Sep. 30, 2008 for PCT Application No. PCT/US05/35624.

U.S. Appl. No. 60/478,154, filed Apr. 24, 2003.

U.S. Appl. No. 60/615,002, filed Sep. 30, 2004.

U.S. Appl. No. 60/641,217, filed Dec. 31, 2004.

Office Action mailed Feb. 3, 2005 for U.S. Appl. No. 10/832,927.

Office Action mailed Jun. 22, 2005 for U.S. Appl. No. 10/832,927.

Notice of Allowance mailed Feb. 9, 2006 for U.S. Appl. No. 10/832,927.

Allowed Claims, U.S. Appl. No. 10/832,927, dated Feb. 9, 2006.

U.S. Appl. No. 60/465,580, filed Apr. 24, 2003.

U.S. Appl. No. 60/503,190, filed Sep. 15, 2003.

Office Action, U.S. Appl. No. 10/832,785, mailed May 28, 2008.

Final Office Action, U.S. Appl. No. 11/324,845, mailed Sep. 5, 2008.

Final Office Action mailed Jan. 5, 2009 for U.S. Appl. No. 10/832,785.

Office Action mailed Feb. 9, 2009, for U.S. Appl. No. 11/324,845.

European Search Report dated Dec. 14, 2008 for EP Patent Application No. 04750678.7.

Office Action, U.S. Appl. No. 11/241,554, mailed Jan. 8, 2009.

International Preliminary Report on Patentability dated Apr. 10, 2008 for PCT Application No. PCT/US2006/038361.

Non-Final Office Action dated Jan. 8, 2009 for U.S. Appl. No. 10/942,762.

* cited by examiner

TRANSPARENT FILE REPLICATION USING NAMESPACE REPLICATION

CROSS REFERENCE TO RELATED APPLICATIONS

This application is claims priority under 35 U.S.C. § 119(e) to: U.S. Provisional Patent Application No. 60/465,578, filed on Apr. 24, 2003, entitled "Method and Apparatus for Transparent File Replication Using the Technique of Namespace Replication," by Thomas K. Wong et al.; U.S. Provisional Patent Application No. 60/465,579, filed on Apr. 24, 2003, entitled "Method and Apparatus for Transparent File Migration Using the Technique of Namespace Replication," by Thomas K. Wong et al.; and is related to U.S. patent application Ser. No. 10/831,376, filed on [date even herewith], entitled "Transparent File Migration Using Namespace Replication," by Thomas K. Wong et al., each of which applications are herein incorporated by reference in their entirety.

BACKGROUND OF THE INVENTION

1. Field of the Invention

This invention relates generally to storage networks and, more specifically, to a network device that tracks locations of an object before and after replication on a back-end, while maintaining transparency for a client on the front-end by using persistent file handles to access the objects.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or dedicated network. Additionally, a SAN file system is part of the operating system or an application running on the client. Different operating systems may require additional copies of each file to be stored on the storage network to ensure compatibility. Communication between file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. When NAS file servers are either added or removed from the storage network, each client must mount or unmount the associated storage resources as appropriate. This is particularly inefficient when there are changes in hardware, but not in the particular files available on the network, such as when a failing NAS file server is swapped out for an identically configured back-up NAS file server.

A related drawback is that a client must be reconfigured each time a file is relocated within the storage network, such as during file migration or file replication. To access objects, the client generates a NAS file handle from a mounted directory. The NAS file handle identifies a physical location of the object on the storage network. To request that the NAS file server perform an operation on the object (e.g., create, delete, etc.), the client sends a NAS request directly to the NAS file server with the NAS file handle. But when the file is relocated to a different NAS file server, subsequent requests for access to the object require a new look-up in an updated directory to generate a new NAS file handle for the new location.

An additional drawback is that NAS file servers are inaccessible during large data transfer operations such as file migrations and replications. These data transfers typically occur during non-business hours to reduce consequential downtime. However, ever-larger storage capacities increase the amount of time necessary for data transfers. Additionally, many enterprises and applications have a need for data that is always available.

Therefore, what is needed is a network device to provide transparency for clients of decentralized file servers such as NAS file servers. Furthermore, there is a need for the network device to maintain transparency through file replications by managing new locations of replicated files, and tracking their availability. Moreover, there is a need for the network device to provide access to data during file replication.

BRIEF SUMMARY OF THE INVENTION

The present invention meets these needs by providing file replications in a decentralized storage network that are transparent to a client. A NAS switch, in the data path of a client and NAS file servers, reliably coordinates file replication of a primary file server to a replica file server using namespace replication to track new file locations. Additionally, the NAS switch maintains data availability during time-consuming data transfers and as a result of failing file servers.

An embodiment of a system configured according to the present invention comprises the NAS switch in communication with the client on a front-end of the storage network, and both a primary file server and a replica file server on a back-end. The NAS switch associates NAS file handles (e.g., CIFS file handles or NFS file handles) received from the primary and replica file servers with switch file handles that are independent of a location. The NAS switch then exports the switch file handles to the client. In response to subsequent object access requests from the client, the NAS switch substitutes switch file handles with appropriate NAS file handles for submission to the appropriate NAS file server.

In another embodiment, the NAS switch comprises a replication module to coordinate replication of source objects at locations on the primary file server to destination objects at locations on the replica file server. Before replicating data, the replication module separately replicates a namespace of the directory hierarchy containing data to be replicated. Namespace replication can also include the use of stored file handles as pointers from objects to be replicated on the file server to the corresponding objects on the primary file server. This replication process allows the NAS switch to track replicated copies of an object. Additionally, the NAS switch keeps the primary file server available during replication, and also maintains consistency across both namespaces by replicating critical operations. The replication module advantageously provides replication services to decentralized file servers and file servers that do not otherwise natively support replication.

In yet another embodiment, the NAS switch comprises a synchronization module to select a switch file handle. The synchronization module looks-up the NAS file handle in a file handle replication table to determine if the object has been replicated and, if not, returns a switch file handle similar to the NAS file handle. The synchronization module looks-up replicated files in a synchronization location table to determine a current primary file server from which to access the object, and checks a status of the current primary server. The synchronization module returns a switch file handle corresponding to the current primary server, or alternate file server if not available.

In still embodiment, the redirection module maintains synchronicity between the primary and replica file servers. When the client requests a critical operation on a replicated object (e.g., create, delete, etc.), the synchronization module replicates the critical operation on other copies of the object. In one embodiment, the synchronization module further comprises a persistent buffer to store operations that have yet to be successfully completed in both namespaces. Thus, if a critical operation is unsuccessful due to a file server failure or otherwise, the synchronization module can resubmit the critical operation until successful.

DETAILED DESCRIPTIONS OF THE INVENTION

The present invention provides file replication in a decentralized storage network that is transparent to clients. The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future storage network protocols other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code.

Figure 1:
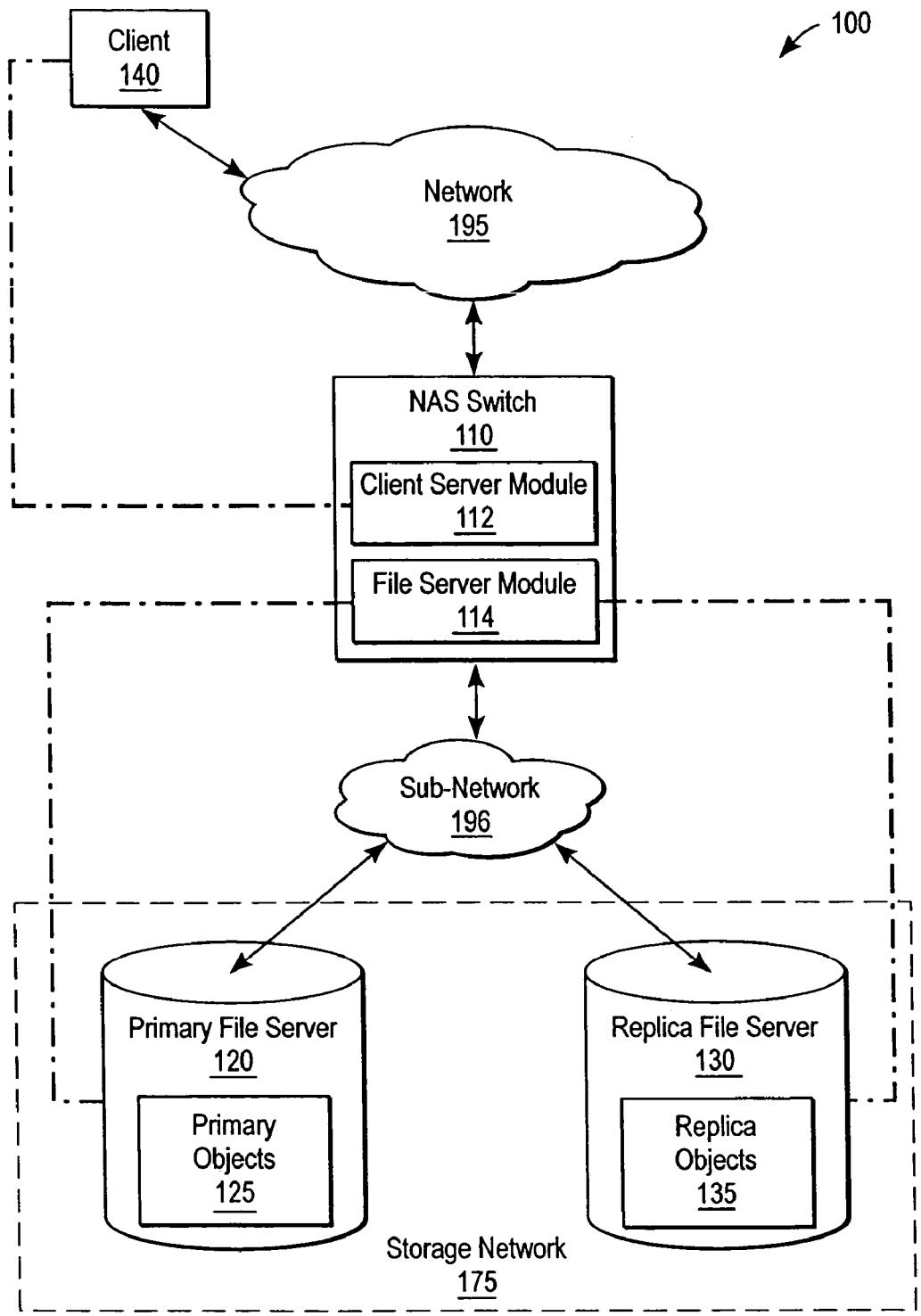
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, a primary file server 120, and a replica file server 130, are each coupled in communication through a sub-network 196. Note that there can be various configurations of the system 100, such as embodiments including additional clients 140, additional primary and/or replica file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 provides continuous transparency to the client 140 with respect to physical configurations and replication operations on the storage network 175. Preferably, the NAS switch 110 emulates file server processes to the client 140 and emulates client processes to the file servers 120, 130. As such, the client 140 is unaware of the NAS switch 110 since the NAS switch is able to redirect NAS requests intended for the primary file server 120 to appropriate locations on the replica file server 130. Thus, the client 140 submits object requests, such as file writes and directory reads, directly to the NAS switch 110. Likewise, the file servers 120, 130 are unaware of the NAS switch 110 since the NAS switch is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a file server module 114 and a client module 112 to facilitate communications and file handle switching. The client module 112 receives exported file system directories from the file servers 120, 130 containing NAS switch handles. To create compatibility between the client 140 and the NAS switch 110, the client module 112 maps the file system directories to internal switch file systems which it sends to the client 140. To request an object, the client 140 traverses an exported switch file system and selects a switch file handle which it sends to the NAS switch 110 along with a requested operation.

The file server module 114 coordinates the replication process. The file server module 114 initiates tasks that are passively performed by the primary and replica file servers

112, 114. The file server module 114 replicates a namespace containing the data to be replicated from the primary file server 120 to the replica file server 130, and then replicates associated data. During and afterwards, the file server module 112 redirects namespace and file object accesses by the client 140 to appropriate locations. Thus, data transfer services remain available to the client 140.

In one embodiment, the file server module 114 also tracks reconfigurations resulting from replication and other processes (e.g. adding or removing file server capacity) with a nested system of tables, or information otherwise linked to the switch file systems. The switch file handles are static as they are persistent through replications, but the associated NAS file handles can be dynamic as they are selected depending upon which particular copy is being accessed. To track various copies of an object, the file server module 114 maintains a file handle replication table, corresponding to each file system, that maps NAS file handles of replicated objects to locations on the storage network 175 and to status information about the replication locations. Further embodiments of the file server module 114 are described with respect to FIG. 2.

In general, NAS file handles uniquely identify objects on the primary or replica file servers 120, 130, such as a directory or file, as long as that object exists. NAS file handles are file server specific, and are valid only to the file servers 120, 130 that issued the file handles. The process of obtaining a NAS file handle from a file name is called a look-up. A NAS file handle, which identifies a directory or file object by location, may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the primary file server 120. A stored file handle is stored in place of a migrated or to be replicated object as a pointer to an alternate location.

Object access requests handled by the NAS switch 110 include, for example, directory and/or file reads, writes, creation, deletion, moving, and copying. As used herein, various terms are used synonymously to refer to a location of an object prior to replication (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the primary and second file servers 120, 130 by using a switch file handle submitted to the NAS switch 110. To access an object, the client 140 first mounts an exported file system preferably containing switch file handles. In another embodiment, however, the exported file system also contains unaltered NAS file handles. The client 140 looks-up an object to obtain its file handle and submits an associated request. From the perspective of the client 140, transactions are carried out by a file server 120, 130 having object locations that do not change. Thus, the client 140 interacts with the NAS switch 110 before and after a file replication in the same manner. A user of the client 140 can submit operations through a command line interface, a windows environment, a software application, or otherwise. In one embodiment, the client 140 provides access to a storage network 175 other than a NAS storage network.

The primary file server 120 is the default or original network file server for the client 140 before file replication. The primary file server 120 further comprises primary objects 125, which include directory metadata and file data such as enterprise data, records, database information, applications, and the like.

The replica file server 130 is able to substitute for, or take over as, the primary network file server for the client 140 during and after file replication. The NAS switch 110 resubmits client requests to the replica file server 130 rather than the primary file server 120 responsive to, for example, a failure, load imbalance, etc. on the primary file server 120. The replica file server 130 further comprises replica objects 135, which include the replicated source directories and files. In one embodiment, more than one replica file server 130 contains a replicated object. Both the primary and replica file servers 120, 130 also preferably comprise a file system compatible with NAS protocols. In one embodiment, the file servers 120, 130 comprise a decentralized file servers, or file servers that otherwise do not natively support file replication.

The network 195 facilitates data transfers between connected hosts (e.g., 110, 120, 130, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

Figure 2:
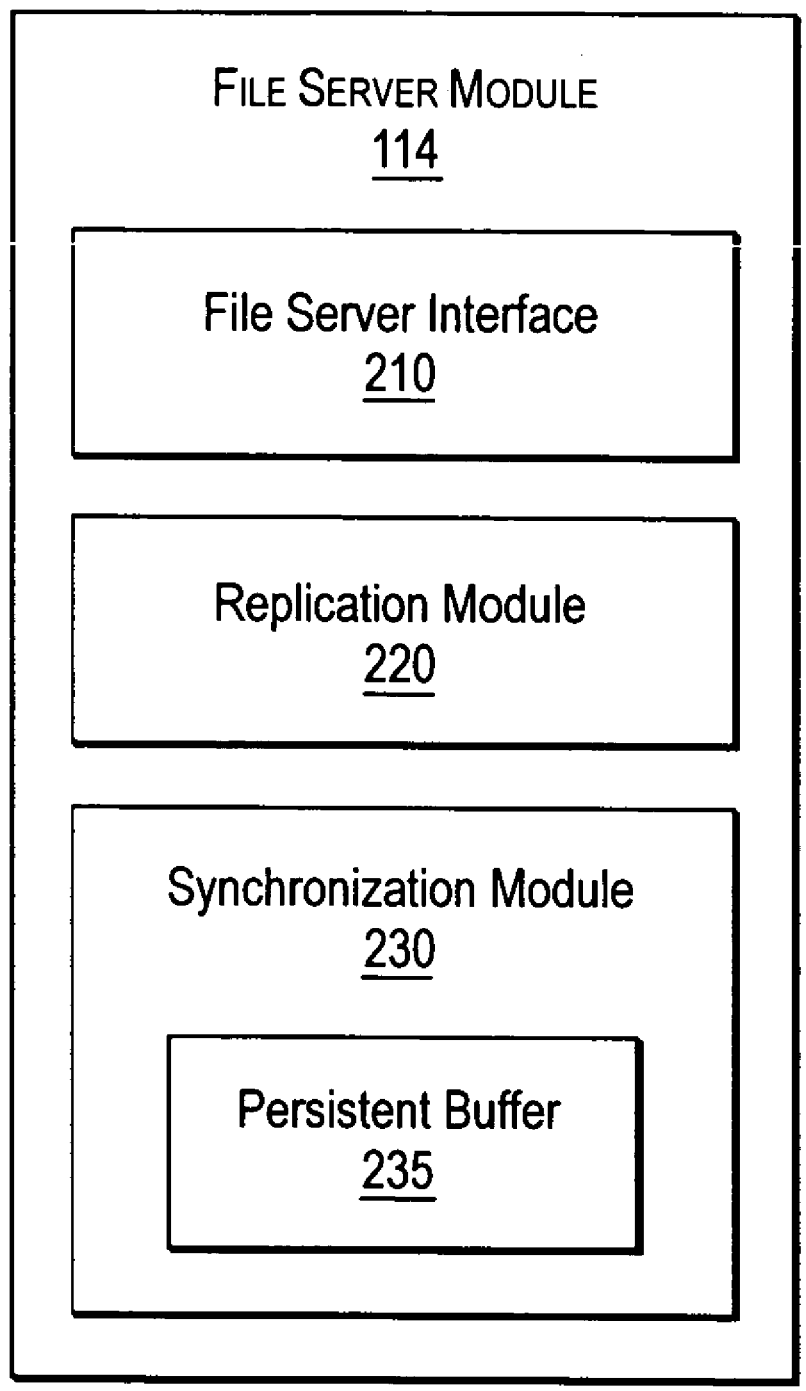
FIG. 2 is a block diagram illustrating the file server module according to one embodiment of the present invention.

FIG. 2 is a block diagram illustrating the file server module 114 according to one embodiment of the present invention. The file server module 114 comprises a file server interface 210, a replication module 220, and a synchronization module 230 with a persistent buffer 235. Generally, the file server interface 210 manages client requests before replication without assistance, but afterwards, checks with the synchronization module 230 for alternative locations or additional processes required by, for example, critical operations. Note that rather than being strict structural separations, "modules" are merely exemplary groupings of functionality corresponding to one or many structures.

The file server interface 210 receives a switch file handle with a request in from the client 140. If the synchronization module 230 does not recognize the switch file handle as an object subject to replication processes, the file server interface 210 forwards the request with an original NAS file handle. Alternatively, the file server interface 210 can receive a replica NAS file handle for the replica file server 130 from the synchronization module 230 responsive to, for example, a need to access the object at a replicated location or a need to maintain synchronicity between file servers 120, 130.

The replication module 220 in the NAS switch 110 coordinates replication such that the primary server 120 and the replica server 130 remain available to the client 140. The replication module 220 replicates directory metadata separate from time-consuming data replication. After successful data replication, the replication module 220 updates the file handle replication table including the location on the primary file server 120 and the location on the replica file server 130. In one embodiment, the replication module 220 recognizes replicated directories in exported file systems and maps replicated objects to primary objects.

The synchronization module 230 substitutes a switch file handle with a replica NAS file handle for objects subject to replication processes. The synchronization module 230 recognizes such objects by looking-up the NAS file handle in a directory replication table and/or a file handle replication table. The directory replication table contains entries for objects that are currently undergoing namespace replication. The file handle replication table contains entries for objects that have completed replication. In one embodiment, the synchronization module 230 further comprises a persistent buffer 235 such as a non-volatile memory to improve data integrity. For critical requests, the synchronization module 230 uses the persistent buffer 235 to ensure that operations are completed in both the primary and replica file servers 120, 130, for example, when one file server is unavailable or experiences any other type of failure.

Figure 3:
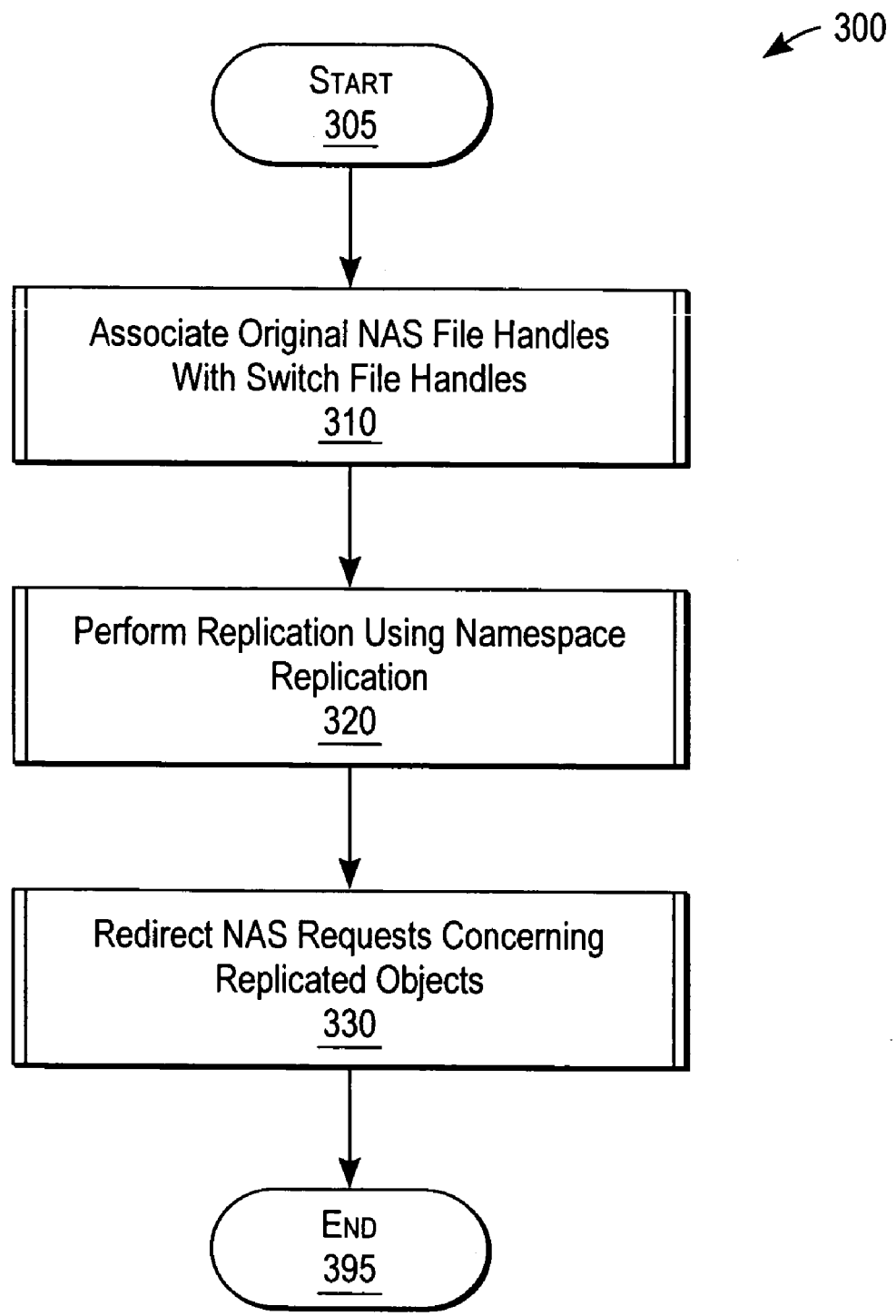
FIG. 3 is a high-level flow chart illustrating a method of providing transparent file replication in a NAS storage network according to one embodiment of the present invention.

FIG. 3 is a high-level flow chart illustrating a method 300 of providing transparent file migration in a NAS storage network according to one embodiment of the present invention. The client server module 112 associates 310 an original NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

The replication module 220 performs 320 file replication using namespace replication as described below with respect to FIG. 5. By separating directory replication from data replication, the replication module 220 is able to process changes to objects being modified during replication and maintains synchronicity between the primary and replica file servers 120, 130.

The replication module 220 redirects 330 NAS requests concerning replicated files as described below with respect to FIG. 6. Because the NAS switch 110 coordinates and stores elements involved in replication, the client 140 continues referring to objects stored in alternative locations with the same switch file handle used prior to replication. On the back end, however, many changes can occur. In one embodiment, the NAS switch 110 uses replications as synchronized data back-ups when the primary file server 110 is nonresponsive, or fails in other ways. In another embodiment, the NAS switch 110 balances requests between servers to optimize latency, I/O bandwidth, and other performance metrics.

Figure 4:
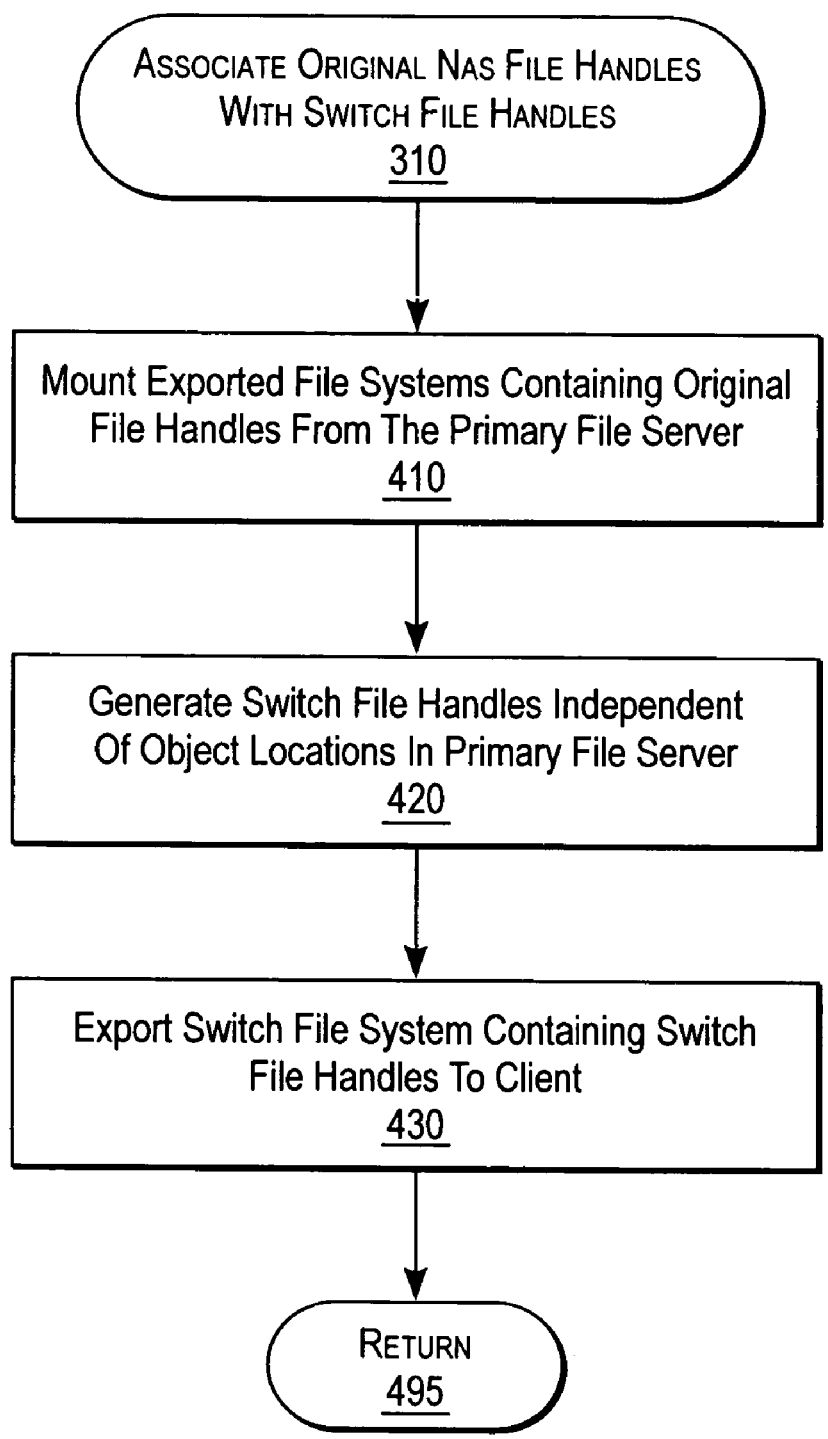
FIG. 4 is a flow chart illustration the method of associating NAS file handles with switch file handles according to one embodiment of the present invention.

FIG. 4 is a flow chart illustration the method 310 of associating a NAS file handle with a switch file handle according to one embodiment of the present invention. Initially, the NAS switch 140 mounts 410 an exported directory of file systems from the primary server 120. In general, the file system organizes objects on a file server 120, 130 into a directory hierarchy of NA file handles. In one embodiment, the NAS switch 110 receives exported directories from associated primary file servers 120, and, in turn, sends exported directories to associated clients 140.

The client module 112 generates 420 switch file handles independent of object locations in the primary file server 120. The client module 112 organizes exported file systems from the file server 120 by replacing file system or tree identifiers with a switch file system number as shown below in Tables 2A and 2B. The client module 112 exports 430 the switch file system to the client 140 to use in requesting operations. In the reverse process, the NAS switch 110 receives the NAS request and searches replicated file handles and/or replicated namespaces using the NAS file handle. Accordingly, the file server interface 210 checks entries of nested tables maintained by the synchronization module 230. The file server interface 210 generates a NAS file handle from the switch file handle based on an object location. An example of the contents of an NFS and CIFS file handle are shown in Tables 1A 1B, while an example of switch file handles or modified NFS and CIFS file handles are shown in Tables 2A and 2B:

TABLE 1A

NFS File Handle Contents

| Field Name | Description |
| --- | --- |
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
| --- | --- |
| tree id | Tree identification - assigned by a CIFS server |
| file id | File identification - unique within a tree identification |

TABLE 2A

Contents of NFS Switch File Handle

| Field Name | Description |
| --- | --- |
| file system id | File system identification - index to NAS switch 110 file system export table that identifies the name and location of a NAS file server |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
| --- | --- |
| file system id | File system identification - index to NAS switch 110 file system export table that identifies the name and location of a NAS file server |
| file id | File identification - unique within a tree identification |

As discussed below, after objects have been replicated, the NAS switch 110 can accesses objects at new locations using updated NAS file handle.

Figure 5:
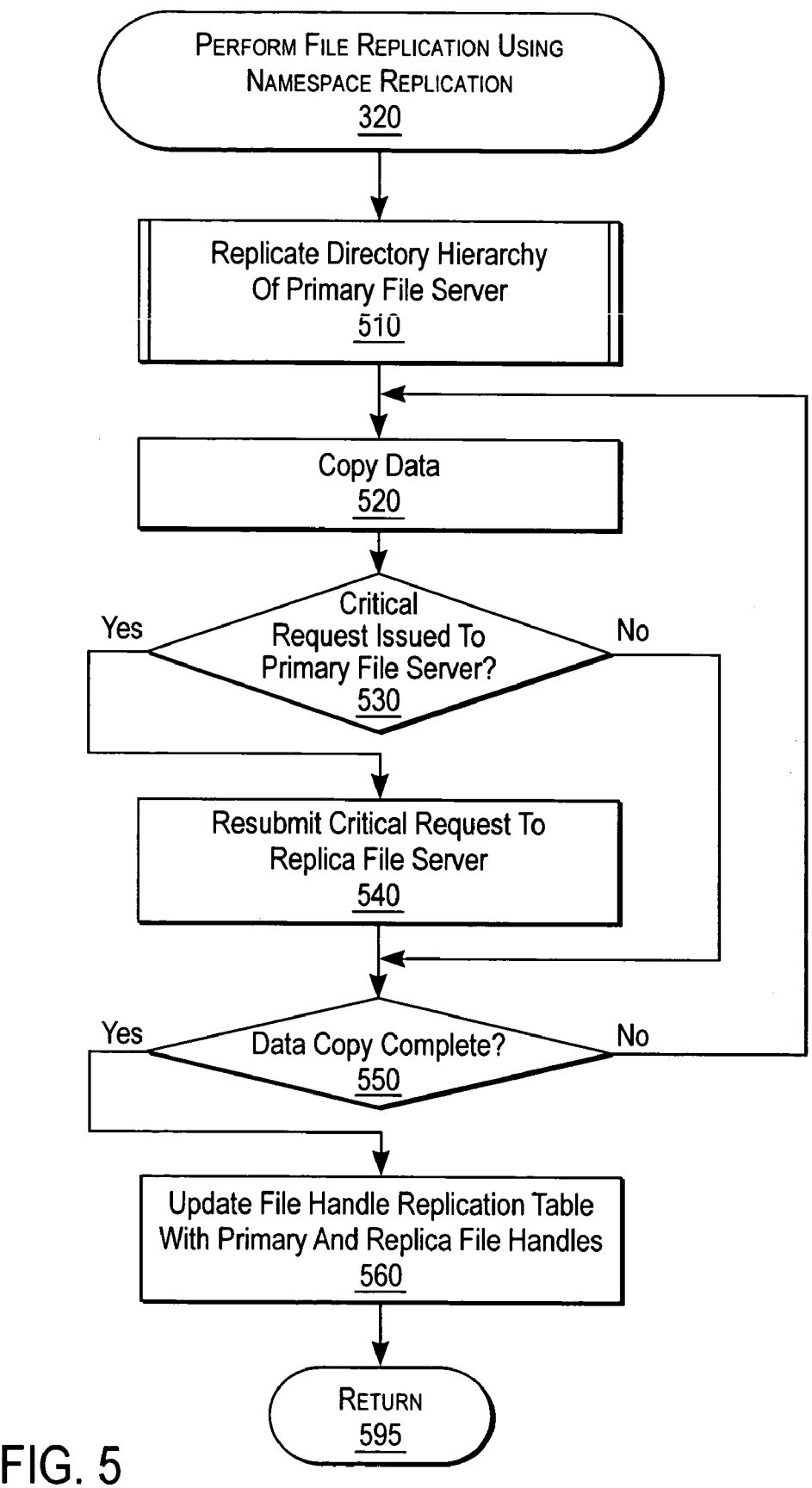
FIG. 5 is a flow chart illustrating the method of performing file replication using namespace replication according to one embodiment of the present invention.

FIG. 5 is a flow chart illustrating the method 220 of performing file replication using namespace according to one embodiment of the present invention. The replication module 220 replicates 510 a directory hierarchy of the primary server 120 to organize data copied from the primary file server 120 to the replica file server 130.

In a separate process, the replication module 220 copies 520 data. If no error occurs during the data transfer, the replica file server 130 commits the data migration. If an error does occur 730, the data transfer is repeated. To commit the data transfer, the reproduction module 220 locks the source file to prevent further access to the file. The reproduction module NAS switch 110 can determine whether a file contains a stored file handle merely by inspecting the file's size. An exemplary stored file format is shown in Table 3:

TABLE 3

Exemplary Stored File Handle

| Byte Offset | Length | Name | Description |
| --- | --- | --- | --- |
| 0-3 | 4 | Stored file handle identifier | 0x06072022 |
| 4-7 | 4 | Stored file handle type | =1 for NFS, =2 for CIFS |
| 8-11 | 4 | Size of stored file handle | Hash value from switch file handle |
| 12-15 | 4 | Contents of stored file handle | Size in bytes |
| 12-size of switch file handle | Size of switch file handle | Padding | See above description |
| | Enough bytes to pad to a length of 419 bytes for NFS and 431 bytes for CIFS | | =0x0 byte |

220 marks the current entry in the replicated fie list as done, and enters the source and destination file handles indicative of the locations on the primary and replica file servers 120, 130 in the file replication table. Finally, the reproduction module 220 resumes access to the source file.

If a critical request is issued to the primary server 530, the synchronization module 230 resubmits 540 the critical request to the replica server 130. When the data copy is complete 550, the replication module 220 updates 560 the file handle replication table.

During data copying, if a client 140 issues a critical request 530 concerning the primary server 120, the synchronization module 230 resubmits 540 the critical request to the replica server 130. In one embodiment, the synchronization module 230 stores requests in the persistent buffer 235 to ensure that critical operations are carried out even if a failure occurs. However, if the request is not a critical request 530, the resubmission is not necessary. Non-critical requests include, for example, read, copy, and other passive operations. When data copying is complete 550, the synchronization module 230 updates 560 the file handle replication table. If there is more data to copy 550, the process loops back to copy data 520.

Figure 6:
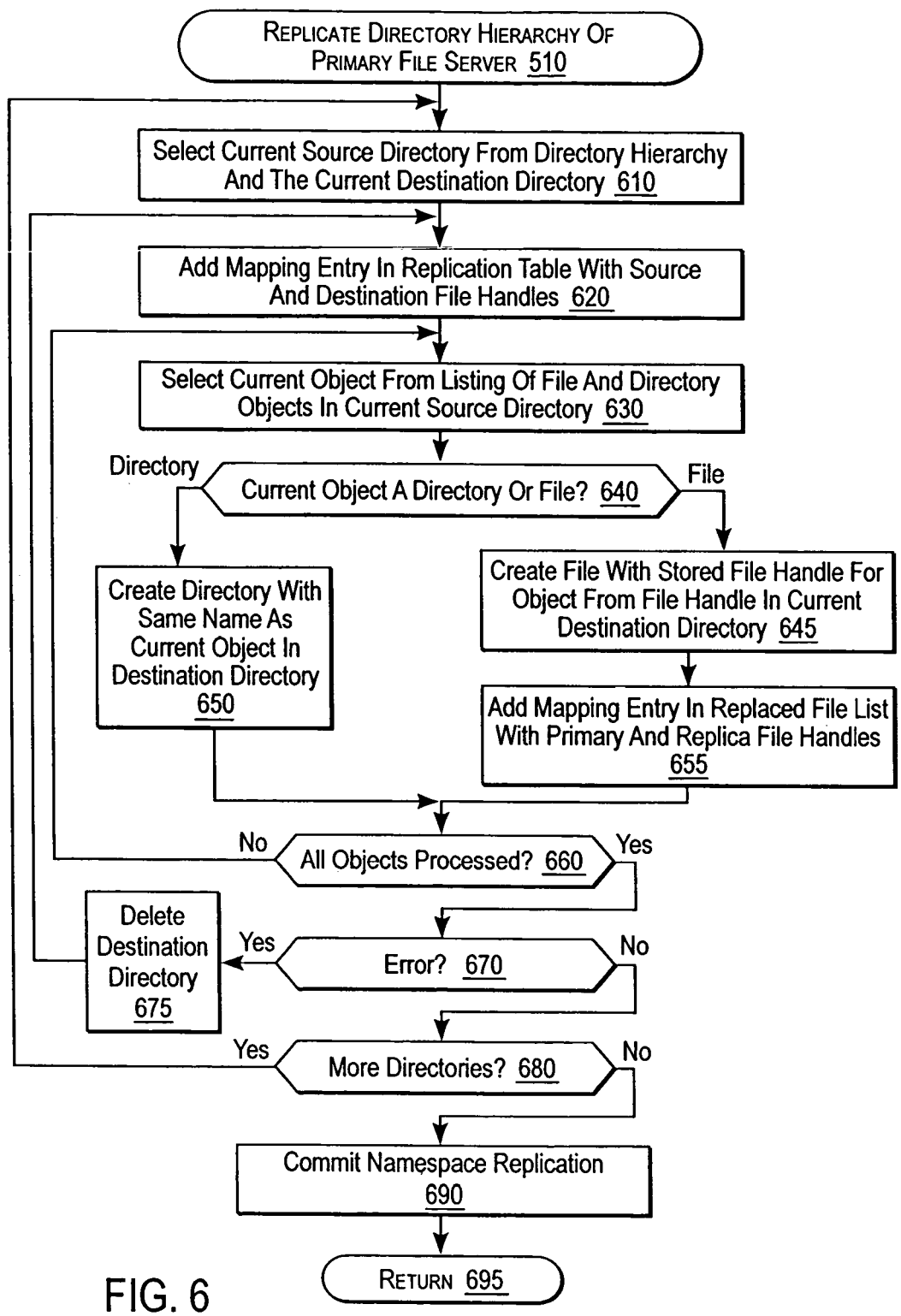
FIG. 6 is a flow chart illustrating the method of replicating a directory hierarchy from a primary server to a replica server according to one embodiment of the present invention.

FIG. 6 is a flow chart illustrating the method 510 of replicating a directory hierarchy from the primary server 120 to the replica server 130 according to one embodiment of the present invention. The reproduction module 220 selects 610 a current source directory from the directory hierarchy of the primary file server 120 and the current destination directory from the replica file server 130. The replication module 220 adds 620 a mapping entry in a replication table with switch file handles related to the source and destination locations. The replication module 220 selects 630 a current object from a listing of file and directory objects in the current source directory.

If the current object is a directory 530, the reproduction module 220 creates 650 a directory in the replica file server 130 with the same name as the current directory in the primary file server 120. On the other hand, if the current object is a file 640, the reproduction module 220 creates 645 a file with a stored file handle for the object from the file handle in the current destination directory. In one embodiment, the stored file handle is similar to the switch file handle. Preferably, the stored file handle is a predetermined size so that the Note, however, that there can be variations of the stored file format. The replication module 220 adds 655 a mapping entry in a replicated file list with source and destination switch file handles.

If all objects have been processed 660, no errors were committed in the process 670, and there are no more directories to replicate 680, the reproduction module 220 commits 690 the namespace replication. However, if there are more objects to be processed 660, the replication module 220 continues the process from selecting 630 objects. If there was an error in the directory or file creation 670, the reproduction module 220 deletes 675 the destination directory, and repeats the process from adding 620 mapping entries. Also, if there are more directories to process 680, the first file server 120 returns to selecting 510 primary directories.

To commit 690 the namespace replication, the reproduction module 220 adds entries to the replicated directory table. As a result, future object access requests will be directed to the replica file server 130 in addition to the primary file server 120. When critical operations are executed on the primary server 120, the replication module 220 uses the replicated directory table to recognize that the request needs to be resubmitted to the replica server 130. The primary file server 120 deletes 620 the replication table since it is no longer needed.

Figure 7:
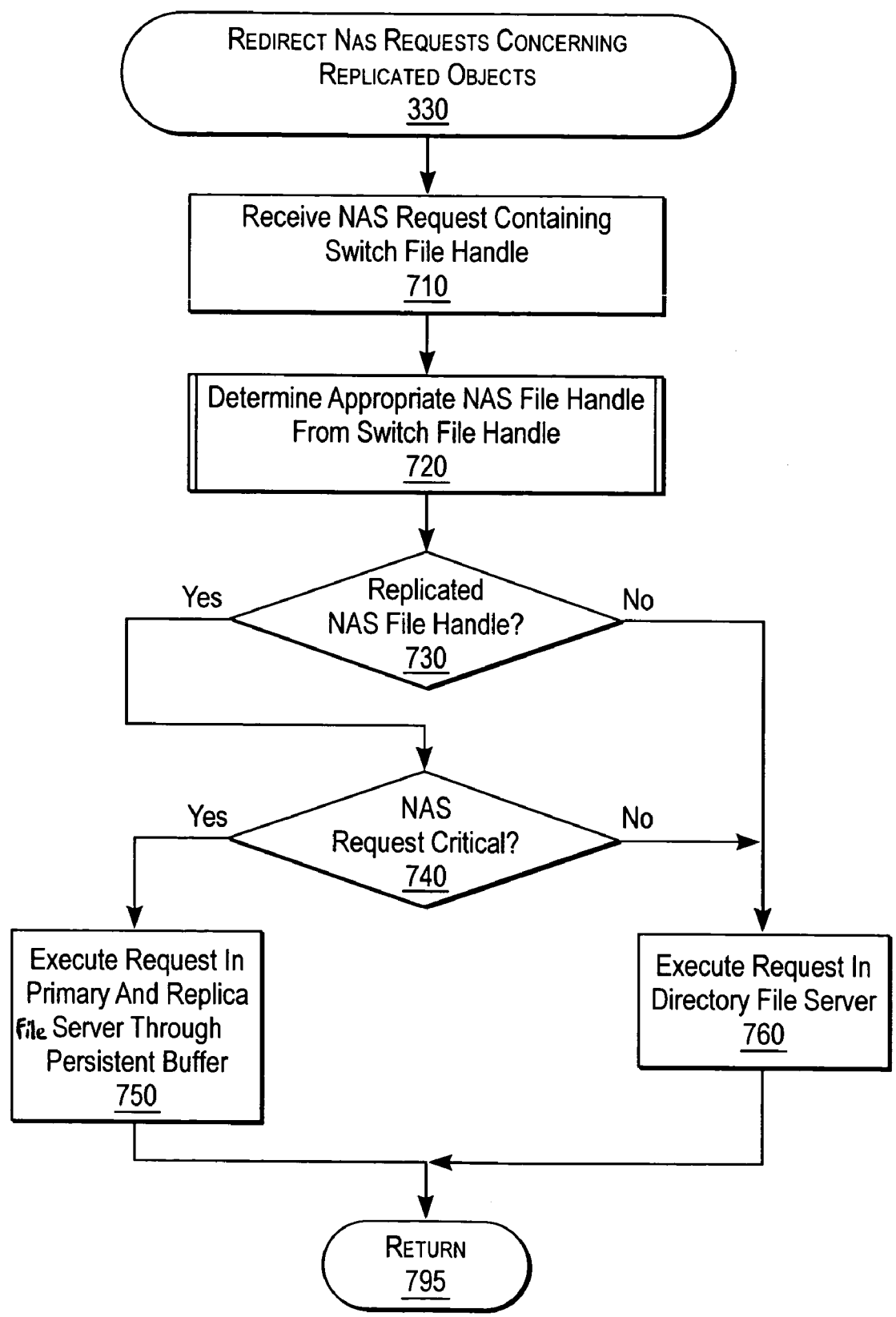
FIG. 7 is a flow chart illustrating the method of redirecting NAS requests concerning replicated objects according to one embodiment of the present invention.

FIG. 7 is a flow chart illustrating the method 230 of redirecting requests concerning replicated objects according to one embodiment of the present invention. The NAS switch 110 receives 710 the NAS request containing the switch file handle from the client 140. The file server interface 210 determines 720 the NAS file handle from the switch file handle as described below with respect to FIG. 8.

If the switch file handle is a replicated file handle 730, and the NAS request is a critical request 740, the synchronization module 230 executes 750 the request in both primary and replica file servers 120, 130 through the persistent buffer 235. By replicating the critical request, the synchronization module 230 is able to keep identical directories and data on a primary file server 120 and each replica file server 130. Because replicated requests are stored in the persistent buffer 235 until successful in all file servers 120, 130, the NAS switch 110 ensures that temporarily unavailable file servers 120, 130 receive the same modifications. In one embodiment, if the synchronization module 230 is unable to successfully complete critical operations, an error message can be returned to the client 140. On the other hand, for non-replicated file handles 730 and/or non-critical NAS requests 740, the file server interface 210 executes 760 the request in the primary file server 120. Since non-critical operations do not modify contents or disrupt synchronicity between file servers 120, 130, replicated requests are not necessary.

Figure 8:
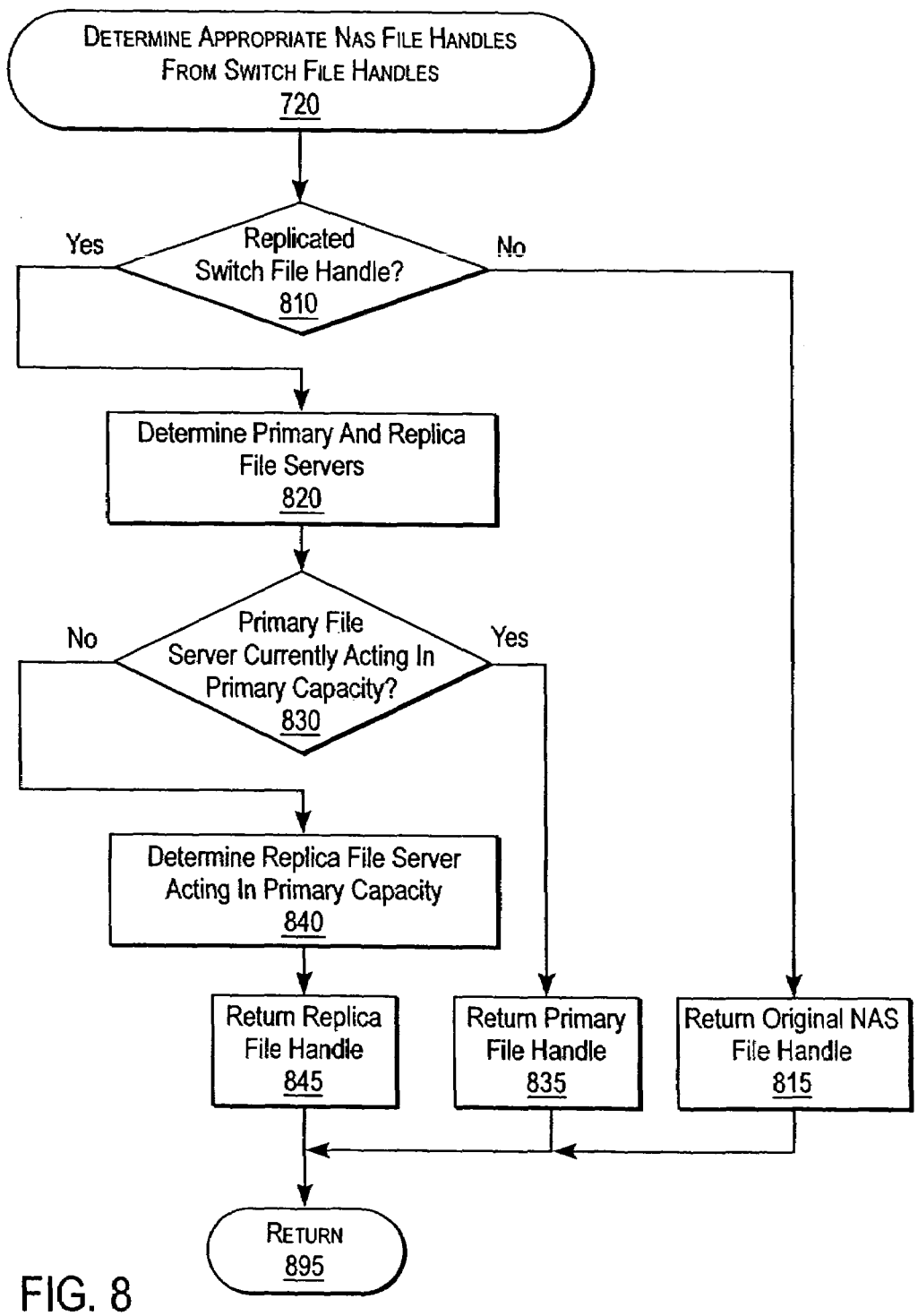
FIG. 8 is a flow chart illustrating the method of determining a NAS file handles from a switch file handles according to one embodiment of the present invention.

FIG. 8 is a flow chart illustrating the method 720 of determining a NAS file handle from a switch file handle according to one embodiment of the present invention. Note that nested tables of FIG. 8 are merely an example as various data structures can be used to associate NAS switch file handles with appropriate switch file handles.

The reproduction module 230 determines if a switch file handle represents a replicated object 810. As described above in Tables 1 and 2, the switch file handle contains a file system ID as exported by the NAS switch 110 to identify a file system as exported by the file servers 120, 130. The NAS switch locates a file handle replication table associated with the file system. The file handle replication table contains: a replicated file handle representing the switch file handle that has been replicated; a primary file handle representing the primary file server 120 when the object is replicated; a replication location ID representing an entry number to a replication location table identifying where the object is replicated; and a primary file attributes representing attributes (e.g., creation date, etc.) that differ between file servers 120, 130, but can be substituted as attributes for the replicated objects when the primary file server 120 is down.

If the object has not been replicated, the replication module 230 returns the original NAS file handle. However, if the object has been replicated, the replication module 230 returns either the primary file handle or the replica file handle after determining 820 the primary file server 120 from the file handle replication table and the replica file servers 130 from the replication location table. The replication location table contains: a current primary file system ID representing the file system acting as the primary file system at the present time; an original primary file system ID representing the configured primary file server 120, and a list of replica file system IDs representing one or more replica file servers 130 containing the replicated object.

To select a file server 120, 130, the reproduction module 230 first determines whether the primary file server 120 is currently acting as the primary server 830. If so, the current primary file system ID from the replication location table matches the primary file handle from the file handle replication table. The reproduction module 230 thus returns 825 the primary file handle as the output NAS file handle. If the current primary file system ID does not match the primary file handle, the reproduction module 230 determines a replica file handle from the current primary file system ID. As such, the reproduction module 230 searches an associated file handle replication table for a primary file handle matching the original primary file handle. The reproduction module 230 returns 835 the replicated file handle of the same entry. In one embodiment, the synchronization module 230 first checks a status of the replica file server 130 in a replica file system status table. The replica file system status table containing: the replication location ID, the replicated file system ID; and a replica file system status representing whether a replica file server 130 is ready to act in a primary capacity, is ready to replicate, or is not ready.

We claim:

1. A method for accessing an object in a storage network, the method comprising:
   at a NAS (Network Attached Storage) switch, mapping a switch file handle that is independent of a location of an object to a first NAS file handle that is indicative of the location of the object on a primary NAS file server;
   providing the switch file handle to a client;
   at the NAS switch, replicating the object on the primary NAS file server to a replica object on a replica NAS file server, the replicating comprising:
      replicating a namespace containing the object, wherein on the replica NAS file server a directory associated with the object is separately replicated from replicating data associated with the object; and
   mapping the switch file handle to a second NAS file handle that is indicative of a location of the replica object on the replica NAS file server.

2. The method of claim 1, wherein the object comprises a directory having objects representative of sub-directories and files.

3. The method of claim 1, wherein the object comprises a file.

4. The method of claim 1, further comprising receiving the switch file handle with a corresponding operation.

5. The method of claim 1, further comprising submitting the switch file handle including the NAS request to the replica NAS file server.

6. The method of claim 1, wherein the replicating the object comprises:
   during the replicating, sending critical requests involving the object to both the primary NAS file server and the replica NAS file server, each critical request comprising a create request, a delete request, a move request or a copy request.

7. The method of claim 1, wherein the replicating the object further comprises:
   prior to replicating the object, storing a file handle in the location on the replica NAS file server, the stored file handle indicative of the location of the object on the primary NAS file server.

8. The method of claim 1, wherein the replicating the object comprises updating a file handle replication table with an entry for the location on the primary NAS file server and an entry for the location on the replica NAS file server responsive to a successful migration.

9. The method of claim 1, further comprising:
   receiving the switch file handle with a request from a client;
   looking-up the second NAS file handle in the file handle replication table with the switch file handle; and
   sending the request to the location on the replica NAS file server.

10. The method of claim 1, further comprising:
    receiving a request concerning a non-replicated object;
    looking-up the non-replicated object in the file replication table with a non-replicated file handle; and
    responsive to failing to find an entry for the non-replicated object in the file handle replication table, sending the second request to a second location on the primary NAS file server.

11. The method of claim 1, wherein the request comprises a read request or a write request.

12. The method of claim 1, wherein the request comprises a create request, a delete request, a move request, or a copy request.

13. The method of claim 1, wherein the NAS file handle comprises a NFS (Network File System) file handle or a CIFS (Common Internet File System) file handle.

14. A method for accessing an object in a decentralized storage network, the method comprising:

at a centralizing switch, mapping a switch file handle that is independent of a location of an object to a first NAS file handle that is indicative of the location of the object on a primary NAS file server;

providing the switch file handle to a client;

at the centralizing switch, replicating the object on the primary NAS file server to a replica object on a replica NAS file server, the replicating comprising:

replicating a namespace containing the object, wherein on the replica NAS file server a directory associated with the object is separately replicated from replicating data associated with the object; and mapping the switch file handle to a second server file handle that is indicative of a location of the replica object on the replica NAS file server.

15. A NAS (Network Attached Storage) switch to access an object in a storage network, comprising:

a file server interface to map a switch file handle that is independent of a location of an object to a first NAS file handle that is indicative of the location of the object on a primary NAS file server; and a replication module to copy the object on the primary NAS file server to a replica object on a replica NAS file server, wherein the replicating module replicates a namespace containing the object, wherein on the replica NAS file server a directory associated with the object is separately replicated from replicating data associated with the object; and wherein the file server interface maps the switch file handle to a second NAS file handle that is indicative of a location of the replica object on the replica NAS file server.

16. The NAS switch of claim 15, wherein the object comprises a directory having objects representative of sub-directories and files.

17. The NAS switch of claim 15, wherein the object comprises a file.

18. The NAS switch of claim 15, further comprising a client module to receive the switch file handle, with a corresponding operation, from a client.

19. The NAS switch of claim 17, wherein the file server module submits the second file handle including the NAS request to the replica NAS file server.

20. The NAS switch of claim 15, wherein a client module receives the switch file handle with a request from a client; a synchronization module looks-up the second NAS file handle in a file handle replication table with the switch file handle; and responsive to finding an entry in the file handle replication table, the server module also sends the request to the location on the replica NAS file server.

21. The NAS switch of claim 15 wherein a client module receives a request concerning a non-replicated object; a synchronization modules looks-up the non-replicated object in the file replication table with a non-replicated file handle; and responsive to failing to find an entry for the non-replicated object in the file handle replication table, the file server module sends the non-replicated request to the primary NAS file server location using the first NAS file handle.

22. The NAS switch of claim 15, wherein the request comprises a read request or a write request.

23. The NAS switch of claim 15, wherein the request comprises a create request, a delete request, a move request, or a copy request.

24. The NAS switch of claim 15, wherein the NAS file handle comprises a NFS (Network File System) file handle or a CIFS (Common Internet File System) file handle.

25. A computer program product, comprising a computer-readable storage medium having computer program instructions and data embodied thereon in a NAS (Network Attached Storage) switch, for accessing an object in a storage network, comprising:

program code for mapping at the NAS switch a switch file handle that is independent of a location of an object to a first NAS file handle that is indicative of the location of the object on a primary NAS file server;

program code for providing the switch file handle to a client;

program code for replicating at the NAS switch the object on the NAS primary file server to a replica object on a NAS replica file server, wherein the replicating the object comprises replicating a namespace containing the object, wherein on the replica NAS file server a directory associated with the object is separately replicated from replicating data associated with the object; and program code for mapping the switch file handle to a second NAS file handle that is indicative of a location of the replica object on the replica NAS file server.

26. The computer program product of claim 25, wherein the object comprises a directory having objects representative of sub-directories and files.

27. The computer program product of claim 25, wherein the object comprises a file.

28. The computer program product of claim 25, further comprising program code for receiving the switch file handle with a corresponding operation.

29. The computer program product of claim 25, further comprising program code for submitting the switch file handle including the NAS request to the replica NAS file server.

30. The computer program product of claim 25, further comprising: program code for receiving the switch file handle with a request from a client; program code for looking-up the second NAS file handle in the file handle replication table with the switch file handle; and program code for sending the request to the location on the replica NAS file server.

31. The computer program product of claim 25, further comprising:

program code for receiving a request concerning a non-replicated object;

program code for looking-up the non-replicated object in the file replication table with a non-replicated file handle; and program code for responsive to failing to find an entry for the non-replicated object in the file handle replication table, sending the second request to a second location on the primary NAS file server.

32. The computer program product of claim 25, wherein the request comprises a read request or a write request.

33. The computer program product of claim 25, wherein the request comprises a create request, a delete request, a move request, or a copy request.

34. The computer program product of claim 25, wherein the NAS file handle comprises a NFS (Network File System) file handle or a CIFS (Common Internet File System) file handle.

* * * * *